United States Statutory Invention Registration [19]

[11] Reg. Number: H466

Reiter

[43] Published: May 3, 1988

[54] HALL EFFECT DEVICE ASSEMBLY

[75] Inventor: Alan C. Reiter, Gaithersburg, Md.

[73] Assignee: The United States of America as represented by the Secretary of the Army, Washington, D.C.

[21] Appl. No.: 92,853

[22] Filed: Sep. 3, 1987

[51] Int. Cl.[4] ..... F42C 19/06

[52] U.S. Cl. ..... 102/293; 102/200

[56] References Cited

U.S. PATENT DOCUMENTS 4,594,944 6/1986 Rongus et al. ..... 102/221

OTHER PUBLICATIONS

Engineering Bulletin 27607A, Sprague Electric Company, Concord, NH 03301.

*Primary Examiner*—Charles T. Jordan
*Attorney, Agent, or Firm*—Saul Elbaum; Thomas E. McDonald; Alan J. Kennedy

[57] ABSTRACT

A system for sensing the angular position of a code ring of magnetic material which is rotatable about a cylindrical housing, also magnetic material, to any one of a predetermined number of code ring settings. Either or both the cylindrical housing and the code ring include permanent magnets to provide a magnetic circuit including both of these elements. The code ring has an inner surface which carries an N-bit digital code of magnetic material in N tracks. N Hall effect digital switches are disposed on the cylindrical housing adjacent the N tracks of digital code bits, respectively. Each Hall effect digital switch senses whether a code bit is adjacent to it. The Hall effect digital switches are read by associated electronics within the housing to provide a digital signal indicating the code ring setting.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HALL EFFECT DEVICE ASSEMBLY

RIGHTS OF GOVERNMENT

The invention described herein may be manufactured, used, and licensed by or for the U.S. Government for governmental purposes without payment to me of any royalty thereon.

BACKGROUND OF THE INVENTION

The invention relates generally to numerical encoding devices for electronic circuits, and, in particular, to a setting ring system of a electronic artillery fuze for sensing the angular position of a setting ring and converting it into a digital electrical signal indicative of that position.

Several types of fuzes used on artillery ammunition require the setting of an event time prior to firing. The fuze setting time system must be a rugged, compact system, at which the time value can be accurately set and displayed, without the use of tools or electric power. In the past, this has often been done by turning the fuze nose relative to marks on the fuze body.

U.S. Pat. No. 4,594,944, issued June 17, 1986 to Rongus et al., discloses a system for setting a timing value of an electronic fuze which utilizes two adjacent setting rings disposed about the outside of the fuze housing. These setting rings are interconnected with the housing so that one ring rotates with the other ring when the other ring is manually rotated in one direction about the housing axis, but is prevented from rotating when the other ring is rotated in the opposite direction. Each ring carries a plurality of numbers disposed about its outer periphery such that one of the numbers is axially aligned with an indication mark on the fuze housing at each setting of the ring. The two series of numbers are oriented laterally such that the two numbers aligned with the indication mark constitute the desired timing value. Each setting ring activates a ring-type membrane switch assembly disposed between the ring and the fuze housing to encode a multi-bit code to the electronic fuze corresponding to the indicated number of that ring.

All of the known systems for manually setting a timing value of an electronic artillery fuze utilize a plurality of mechanical switches which are opened or closed in accordance with the angular position of the setting ring associated with the switches to determine the digital signal encoded to the fuze at the time of firing. During long periods of storage, the contacts of the mechanical switches are subject to corrosion. Thus, it would be highly desirable if the encoding mechanism did not included any moving contacts subject to such corrosion.

SUMMARY OF THE INVENTION

The invention includes a code ring of magnetic material which is rotatable about a cylindrical housing, also magnetic material, to any one of a predetermined number of code ring settings. Either or both the cylindrical housing and the code ring include permanent magnets to provide a magnetic circuit including both of these elements. The code ring has an inner surface which carries an N-bit digital code of magnetic material, in N tracks. N Hall effect digital switches are disposed on the cylindrical housing adjacent the N tracks of digital code bits, respectively. The physical dimensions and magnetic properties of the magnetic circuit and the magnetic code bits on the inside of the code ring are such that each Hall effect digital switch senses whether a code bit is adjacent to it. The N Hall effect digital switches are interrogated or read by associated electronics within the housing to yield the position code of the code ring.

The major advantage of the present invention derives from the "non-contact" aspect of Hall effect switches. In the present invention, reliability through long term storage will not be degraded by corrosion and surface film effects such as suffered by mechanical switch contacts.

BRIEF DESCRIPTION OF THE DRAWINGS

The invention will be better understood, and further objects, features and advantages will become more apparent from the following description of preferred embodiments, taken in conjunction with the accompanying drawings in which.

DESCRIPTION OF THE PREFERRED EMBODIMENTS

Figure 2B:
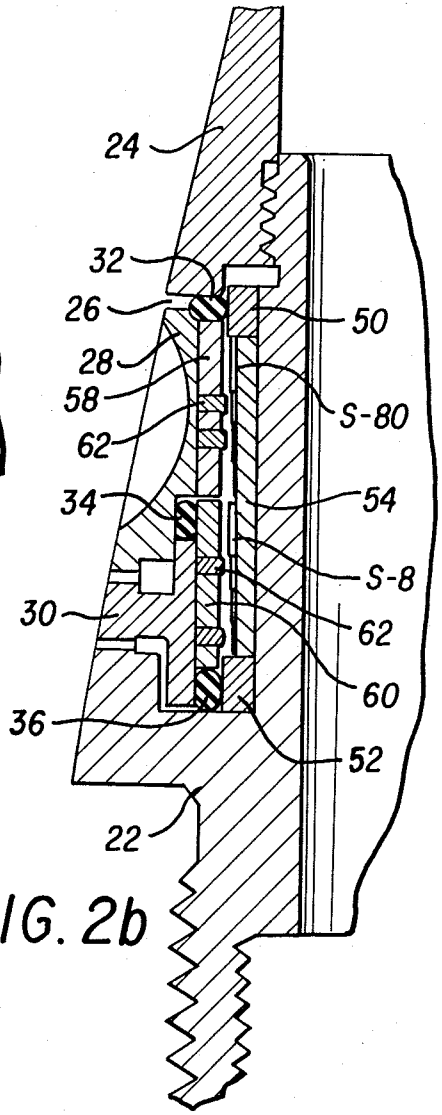
FIGS. 2*a* and 2*b* show a partial front view and a cross section of the time setting rings of the fuze shown in FIG. 1.
Figure 2A:
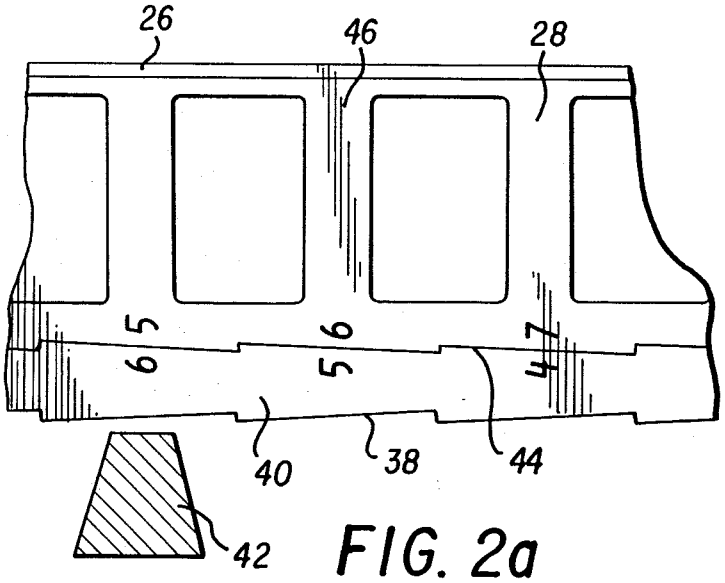
Figure 1:
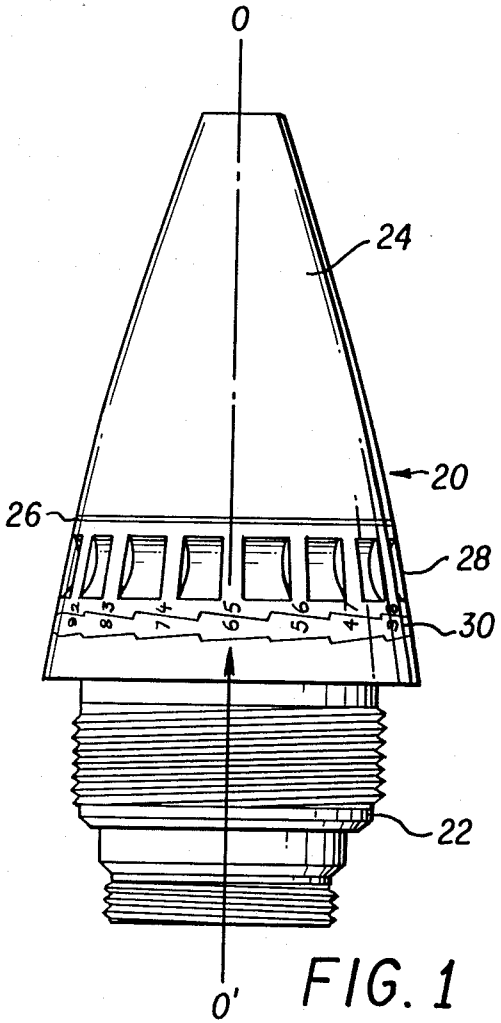
FIG. 1 is a side view of an artillery fuze, having time setting rings in accordance with the invention.
Figure 3:
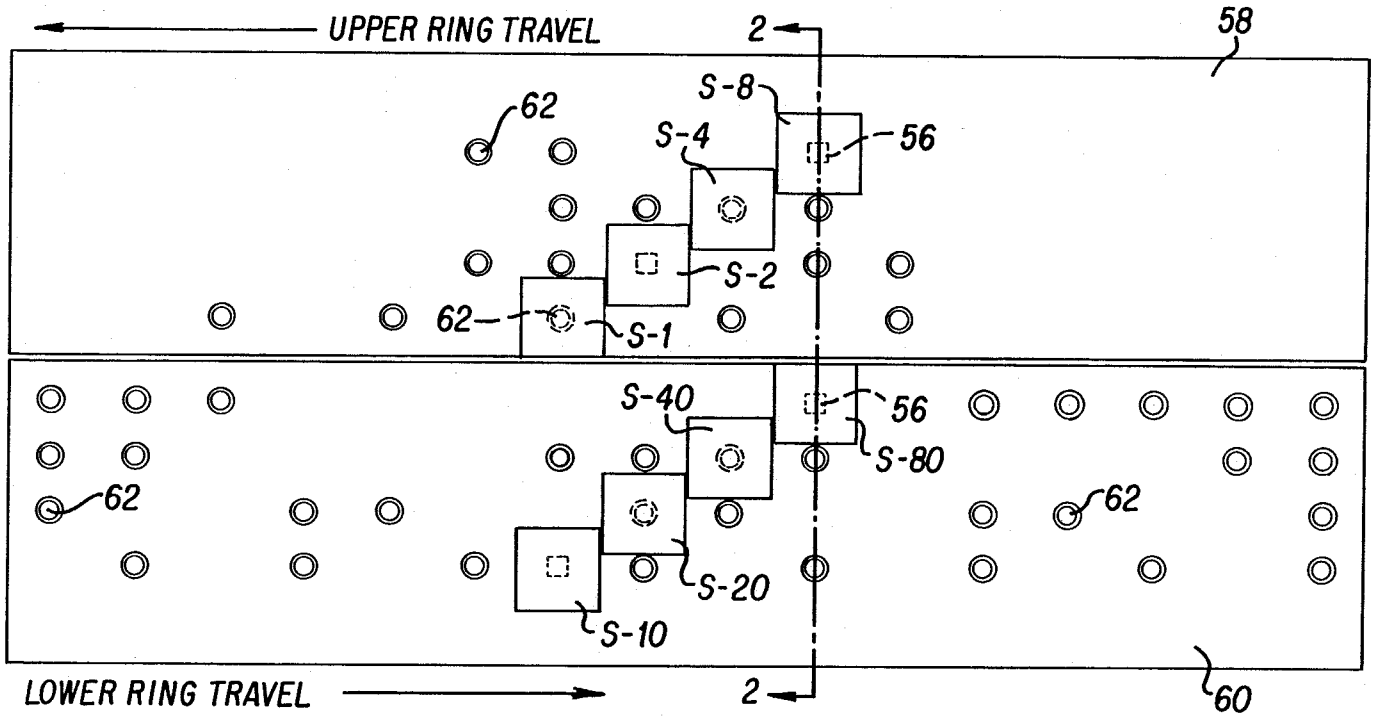
FIG. 3 is a schematic showing the digital code bits carried by the setting rings in the embodiment of FIG. 1, and the Hall effect switches activated by these code bits.

The artillery fuze shown, in FIGS. 1–3 herein is similar to that shown and described in U.S. Pat. No. 4,594,944, issued June 17, 1986 to Rongus et al., which is incorporated by reference herein. The fuze has a housing 20 which includes a lower portion 22 and an upper portion 24. The housing portion 22 is threadedly engaged with the top end of an artillery projectile (not shown), and the housing top portion 24 is threadedly engaged with the housing portion 22 to define an annular recess 26 extending about the housing 20. Two setting rings 28, 30 are disposed in the annular recess 26 so as to be continuously rotatable in at least one direction of rotation about the axis O–O′ of the housing 20. The inner portion annular recess 26 is sealed by three rubber O-rings 32,34,36, which are disposed respectively between the housing 20 and the upper ring 28, between the upper and lower rings 28, 30, and between ring 30 and the housing 20. In addition to its sealing function, the O-ring 32 also exerts an axially-downward force against the two rings 28, 30 to maintain the upper ring 28 in contact with the lower ring 30, and to maintain the lower ring 30 in contact with the housing 20. The lower ring 30 is interconnected with the housing 20 by a set of buttress and ramp shaped teeth 38 which are disposed on adjacent sides of the lower ring 30 and the housing 20 and which are held in engagement by the axial force exerted by the O-ring 32. This set of buttress and ramp shaped teeth 38 prevents the lower ring 30 from being rotated in a clockwise direction, as seen from the top of the fuze, but allows the lower ring 30 to be continuously rotated in a counterclockwise direction to sixteen positions or settings. The outer surface 40 of the lower ring 30 also carries a series of sixteen numbers, from 0 to 15, which are disposed about the periphery of the lower ring 30 such that, at each setting of the lower ring 30, one of these numbers 0–15 is aligned with an indication mark 42 on the outer surface of the housing 20 adjacent the lower ring 30.

The upper setting ring 28 is interconnected with the lower setting ring 30 by another set of buttress ramp shaped teeth 44, which are disposed on adjacent facing sides of the two rings 28, 30 and which prevent the upper ring 28 from being rotated relative to the lower ring 30 in a counterclockwise direction, as seen from the top of the fuze, but allows the upper ring 28 to be rotated continuously in a clockwise direction relative to the lower ring 30 and the housing 20 to ten positions or settings.

The outer surface 46 of the upper ring 28 also carries a series of ten numbers, ranging from 0–9, which are disposed about the upper ring so that one of these numbers 0–9 is aligned with the indication mark 42 on the housing 20 at each setting of the upper ring 28. Also, this series of numbers 0–9 is laterally oriented in the same direction as the series of numbers 0–15 on the lower ring 30 so that, at each combination of settings of the upper and lower rings 28, 30, the numbers on these two rings aligned with the indication mark 42 can be read as single numerical value, in standard decimal format, which corresponds to a desired timing value in seconds to be encoded to the fuze.

The setting rings 28,30 are axially biased and interconnected with the housing 20 so that the desired timing value to be encoded to the fuze can be quickly and accurately set and displayed in standard decimal format by manually rotating the upper ring 28. When the upper ring 28 is rotated against the restraining force exerted by the O-ring 32 in a counterclockwise direction, as seen from the top of the fuze, the set of buttress and ramp shaped teeth 44 causes the lower ring 30 to be rotated with the upper ring 28. However, when the upper ring 28 is rotated in a clockwise direction, as seen from the top of the fuze, the lower ring 30 is prevented from rotating from the upper ring 28 by the set of buttress and ramp shaped teeth 38. Thus, the upper ring 38 is rotated first in a counterclockwise direction to set the lower ring 30, then in a clockwise direction to set the upper ring 28.

The housing lower portion 22 includes three annular elements of magnetic material disposed in the annular recess 26 beneath the upper and lower rings 28, 30. These magnetic elements include a top ring 50, a bottom ring 52, and an intermediate cylindrical sleeve 54. Eight Hall effect digital switches S-1, S-2, S-4, S-8, S-10, S-20, S-40, and S-80, are disposed on the magnetic sleeve 54 shown in FIGS. 2 and 3. There are many types of commercially available Hall effect digital switches which can be used in this invention. For example, Hall effect digital switches similiar to the digital switch catalog number UGS-3040 U, manufactured by the Sprague Electric Company, Concord, N.H. can be used in this invention. In these types of digital switches, the Hall voltage generator 56 for sensing magnetic flux is small in comparison to the overall size of the digital switch. In view of this, these Hall effect digital switches can be staggered about the periphery of the magnetic sleeve element 54, as shown in FIG. 3, to minimize the axial dimension of the assembly.

Generally, in these types of digital switches, the Hall voltage generator 56, which is energized from a direct voltage source, controls a solid state switching device, such as a transistor, connected between two output terminals by switching it between an open state and a closed state. The solid state device is switched from one state to the other state whenever the magnetic flux sensed by the Hall voltage generator 56 exceeds an OPERATE threshold value, and is switched back from the other state to the one state whenever the magnetic flux sensed by the Hall votage generator 56 is reduced below a RELEASE threshold value which is less than the OPERATE threshold value. The state of the solid state device can be read out by applying a voltage across the two output terminals.

The inner portion of the upper setting ring 28 includes an annular element 58 of magnetic material which extends above the four Hall effect digital switches S-1, S-2, S-4, and S-8. Similarly, the inner portion of the lower setting ring 30 includes an annular element 60 of magnetic material which extends over the four Hall effect digital switches S-10, S-20, S-40, and S-80. The upper ring magnetic element 58 includes fifteen rods 62 of magnetic material which are disposed in four circular tracks extending across the Hall voltage generators 56 of the four Hall effect digital switches S-1, S-2, S-4, and S-8. Similarly, the lower ring magnetic element 60 includes thirty-two rods 62 of magnetic material which are disposed in four circular tracks extending across the Hall voltage generators 56 of the four Hall effect digital switches S-10, S-20, S-40, and S-80. The arrangement and number of magnetic rods 62 are such that a different combination of these rods are respectively disposed directly over the Hall voltage generators 56 of the digital switches S-1, S-2, S-4, S-8, S-10, S-20, S-40, and S-80 at each angular setting of the rings 28,30. The inner ends of these magnetic rods 62, may be rounded or beveled, as shown in FIGS. 2 and 3, to prevent any of these rods 62 from gouging the plastic case of an adjacent Hall effect digital switch in the event that either of the setting rings 28, 30 have more lateral movement than normal.

The magnetic elements 50, 52, 54, 58, 60, 62 constitute an adjustable magnetic circuit for selectively activating the Hall effect digital switches. In order to provide the necessary magnetic fluxes to activate these Hall effect digital switches, some of these magnetic elements must be permanently magnetized. For example, the rods 62 can be formed of a permanent magnetic material and permanently magnetized in a radial direction. The upper ring 50 and lower ring 52 of this magnetic circuit can be formed of a permanent magnetic material such as Alnico. If permanent magnets are used for both the rings 50, 52 and the rods 62, the rings 50, 52 should be magnetized in an opposite radial direction from that of the rods 62. If only the rings 50, 52 are permanent magnets, the rods 62 can be integrally formed with the setting ring magnetic elements 58, 60 by embossing the inner surface of these elements.

The magnetic circuit is designed so that the magnetic flux sensed by the Hall voltage generator of any digital switch S-1, S-2, S-4, S-8, S-10, S-20, S-40, or S-80 exceeds the OPERATE threshold whenever one of the rods 62 is disposed directly over the Hall voltage generator 56, and so that the magnetic flux sensed by the Hall voltage generator 56 is less than the RELEASE threshold whenever none of the rods 62 is disposed over the digital switch.

The magnetic rods 62 of the upper setting ring 28 constitutes a 4-bit binary code corresponding to ten numerical timing values which is read by the Hall effect digital switches S-1, S-2, S-4, and S-8. Similarly, the lower setting ring magnetic rods 62 constitute a 4-bit binary code corresponding to sixteen numerical timing values which is read by the four Hall effect digital switches S-10, S-20, S-40, and S-80. At the time of firing of the projectile, the Hall effect digital switches are energized from a direct voltage source of the fuze. If the magnetic flux values sensed by the Hall voltage generators 56 are above the OPERATE threshhold, the digital switches S-1, S-2, S-4, S-8, S-10, S-20, S-40 or S-80 will encode digital signals corresponding to time values of 1, 2, 4, 8, 10, 20, 40, or 80 seconds, respectively. During operation of the fuze, the two encoded 4-bit binary codes are processed by conventional circuitry to provide a time delay corresponding to the displayed time setting, that is, a time delay which is equal in seconds, to the number of the upper setting ring 28 adjacent to the indication mark 42 plus the number on the lower setting ring 30 adjacent to indication mark 42 times ten. For example, when the setting rings 28, 30 are set for a timing value of 65 seconds, as shown in FIGS. 1 and 2, the Hall effect digital switches S-1, S-4 ,S-20, and S-40, are activated to provide binary codes to the electronic fuze corresponding to the numerical value 65.

Figure 4:
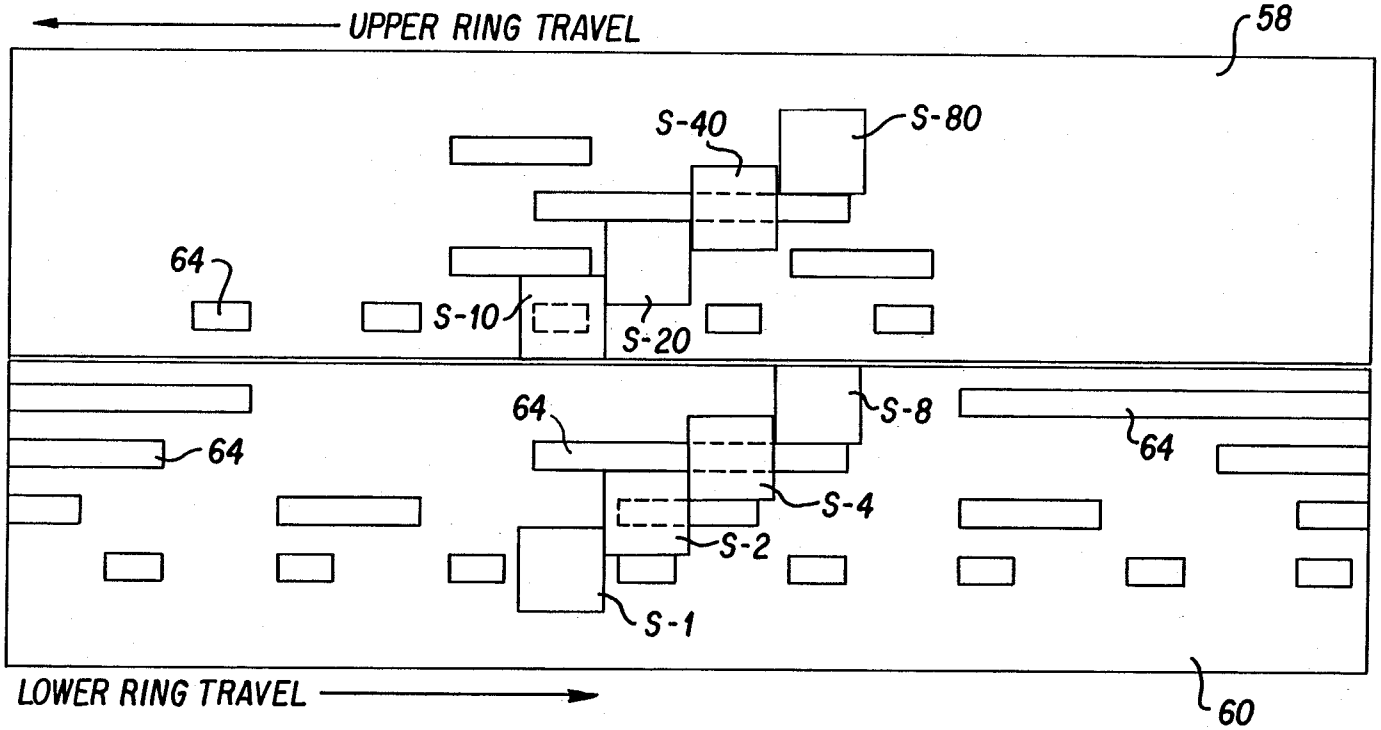
FIG. 4 is a schematic showing the digital code bits carried by the setting rings in a second embodiment of the invention and the Hall effect switches activated by these code bits.

FIG. 4 illustrates a variation of the embodiment shown in FIG. 1, in which the magnetic rods 62 are replaced by strips 64 of permanently magnetized plastic material which are secured to the inner surfaces of the setting ring magnetic elements 58, 60.

Since there are many modification variations and additions to the specific embodiments of the invention described herein which would be obvious to one skilled in the art, it is intended that the scope of the invention be limited only by the appended claims.

What is claimed and desired to be secured by Letters Patent of the United States is:

1. In an electronic device having a housing which includes an axis and having an annular setting ring which is disposed about the housing axis and is interconnected with the housing to be rotatable about the housing axis to a plurality of preselected angular positions, a system for sensing the angular position of the setting ring and coverting it into a digital signal indicative of that position, comprising:

a first element of magnetic material, which is integral with or affixed to the housing and which includes an outer cylindrical surface extending about the housing axis beneath the setting ring;

a plurality of axially-spaced Hall effect digital switches, affixed to the outer surface of the first magnetic element and connected to be energized by a direct voltage source, each energized switch being operable in either an open state or a closed state, each switch switching from one state to the other state whenever magnetic flux supplied to it exceeds an OPERATE threshold and each switch switching back from the other state to said one state whenever the magnetic flux supplied to it is reduced below a RELEASE threshold which is less than the OPERATE threshold;

a second element of magnetic material, which is integral with or affixed to an inner portion of the setting ring and which includes an inner cylindrical surface extending about the housing axis concentric with the outer surface of the first magnetic element;

a plurality of third elements of magnetic material, which are integral with or affixed to the second magnetic element and which extend radially inward from the inner cylindrical surface of the second magnetic element, the third magnetic elements being disposed in a plurality of axially-spaced circular tracks which extend respectively over the Hall effect digital switches, the arrangement and number of third magnetic elements in each track being such that a different combination of third magnetic elements are disposed directly over the plurality of Hall effect digital switches at each preselected angular position of the setting ring;

an adjustable magnetic circuit for selectively activating the Hall effect digital switches to indicate the setting ring position, including the first, second, and third magnetic elements and a magnetic flux generator which provides magnetic flux to the magnetic circuit such that the magnetic flux supplied to any Hall effect digital switch disposed directly beneath a third magnetic element exceeds said OPERATE threshold and the magnetic flux supplied to any Hall effect digital switch not disposed beneath a third magnetic element is less than said RELEASE threshold, wherein the plurality of third magnetic elements consititues a multi-bit code which is sensed by the plurality of Hall effect digital switches, the combination of open and closed states of the Hall effect digital switches indicating the angular position of the setting ring; and encoding means for energizing the Hall effect digital switches, sensing the open or closed states of the Hall effect digital switches, and generating the digital signal indicative of the angular position of the setting ring.

2. A system, as described in claim 1, wherein the third magnetic elements are formed of permanent magnetic material and are permanently magnetized in a radial direction, and wherein the magnetic flux generator comprises the third magnetic elements.

3. A system, as described in claim 2, wherein the third magnetic elements comprise rods of magnetic material.

4. A system, as described in claim 2, wherein the third magnetic elements comprise strips of permanently magnetized plastic material.

5. A system, as described in claim 2, wherein the magnetic flux generator further comprises at least one ring of permanent magnetic material disposed concentric with the setting ring in the magnetic circuit intermediate the first magnetic element and the second magnetic element.

6. A system, as described in claim 1, wherein the magnetic flux generator comprises at least one ring of permanent magnetic material which is disposed concentric with the setting ring in the magnetic circuit intermediate the first magnetic element and the second magnetic element and which is permanently magnetized in a radial direction.

* * * * *